United States Patent
Pandey

(10) Patent No.: US 10,552,127 B2
(45) Date of Patent: Feb. 4, 2020

(54) METHOD AND SYSTEM FOR DEVELOPING RELATION-CONTEXT SPECIFIC SOFTWARE APPLICATIONS

(71) Applicant: Raju Pandey, Davis, CA (US)

(72) Inventor: Raju Pandey, Davis, CA (US)

(*) Notice: Subject to any disclaimer, the term of this patent is extended or adjusted under 35 U.S.C. 154(b) by 0 days.

(21) Appl. No.: 16/058,193

(22) Filed: Aug. 8, 2018

(65) Prior Publication Data

US 2019/0050208 A1    Feb. 14, 2019

Related U.S. Application Data

(60) Provisional application No. 62/543,957, filed on Aug. 10, 2017.

(51) Int. Cl.
   *G06F 8/41*    (2018.01)

(52) U.S. Cl.
   CPC .............. *G06F 8/41* (2013.01); *G06F 8/42* (2013.01); *G06F 8/436* (2013.01)

(58) Field of Classification Search
   CPC ..... G06F 8/30; G06F 8/41; G06F 8/42; G06F 8/427; G06F 8/436; G06F 8/71
   USPC ................................................ 717/140–161
   See application file for complete search history.

(56) References Cited

U.S. PATENT DOCUMENTS

| | | | | |
|---|---|---|---|---|
| 2004/0031023 A1* | 2/2004 | Li | ............... | G06F 9/4492 717/140 |
| 2005/0223010 A1* | 10/2005 | Murray | ............... | G06Q 10/10 |
| 2006/0150164 A1* | 7/2006 | Agrawal | ............... | G06F 8/38 717/136 |
| 2009/0024986 A1* | 1/2009 | Meijer | ............... | G06F 8/41 717/137 |
| 2009/0328012 A1* | 12/2009 | Aharoni | ............... | G06F 9/45516 717/140 |
| 2012/0078968 A1* | 3/2012 | Nixon | ............... | G06F 16/14 707/792 |
| 2016/0070641 A1* | 3/2016 | Printz | ............... | G06F 11/3692 717/124 |
| 2016/0179490 A1* | 6/2016 | Lee | ............... | G06F 8/447 717/146 |

* cited by examiner

*Primary Examiner* — Qing Chen

(57) ABSTRACT

Some embodiments described herein provide a system to run a source program. The system receives a source program with derived variables and/or derived functions. The system first performs syntax and semantic analysis on the received source program, and subsequently generates executable code. When the source program has a derived variable, the system generates executable code for: creating an object that includes the derived variable, assigning a value to the derived variable, and searching for a value of the derived variable at runtime. When the source code has a derived function, the system generates executable code for searching for a value of the derived function at runtime. Finally the system runs the generated executable code at runtime.

20 Claims, 10 Drawing Sheets

METHOD AND SYSTEM FOR DEVELOPING RELATION-CONTEXT SPECIFIC SOFTWARE APPLICATIONS

RELATED APPLICATION

This application hereby claims priority under 35 U.S.C. § 119 to U.S. Provisional Application No. 62/543,957 entitled "METHODS FOR DEVELOPING, DEPLOYING, TESTING, AND MANAGING PLATFORM-INDEPENDENT SOFTWARE," by inventor Raju Pandey, filed on 10 Aug. 2017.

FIELD

The present invention generally relates to techniques for developing software for applications that exhibit complex relation and context-specific state and behavior. More specifically, the present invention relates to a method and apparatus for building software using a programming language and a set of tools that enable definition, compilation and execution of relations, relation expressions, relation-context specific state and relation-context specific behavior.

BACKGROUND

Development and management of complex software systems has relied on a variety of software techniques. These techniques include abstractions (such as modules, function, classes, and objects) that enable developers to divide software components into smaller and more manageable entities, reusability concepts (such as libraries, templates, inheritance, and generative abstractions) that allow developers to either use or extend an existing software artifact, and software engineering patterns (such as command, Model View Controller, Proxy, etc.) that capture software solutions to commonly occurring problems.

Programming languages and tools have been developed that directly or indirectly provide mechanisms to support the above described software techniques. For instance, object-oriented programming languages such as Java™ provide direct support for functions, classes, inheritance, and modules, etc., to help software developers build software easily and efficiently.

As software systems become more complex and model real world entities, real world relationships, and real world behaviors, software applications need the ability to model states and behaviors that are dependent not only on individual entities, but also on the relationships within which these entities occur.

Embodiments described herein present methods for enabling software applications and systems to model, identify, specify, and implement software entities whose states and specific behavior depend on relationships with other software entities.

SUMMARY

Some embodiments described herein provide techniques and systems for compiling a source program and executing the binary. During operation, the system first receives a source program. Next, the system performs syntax and semantic analysis on the received source program. The system then generates executable code comprising: code for creating an object that includes a derived variable in the set, code for assigning a value to a derived variable in the set, and code for searching for a value of a derived variable in the set at runtime. Finally, the system runs the generated executable code at runtime.

In some embodiments described herein, in response to receiving an instruction to create an object, the system allocates space for components of objects and for storing the states of the derived variables in the object.

In some embodiments described herein, the state of a derived variable includes the value of the variable, and the information that the value of the derived variable is either defined locally or is obtained from a related object.

In some embodiments described herein, in response to receiving an instruction to assign a value to a derived variable, the system stores in the maintained state the value and the information that the value of the derived variable is defined locally.

In one embodiment described herein, in response to receiving an instruction to find the value to a derived variable, the system recursively searches for a value for the derived variable in related objects.

In some embodiments described herein, the system searches for a value for the derived variable in related objects using depth-first, breadth-first, other graph search algorithms, or combination thereof.

Some embodiments described herein provide techniques and systems for running a source program. During operation, the system first receives a source program. Next, the system performs syntax and semantic analysis on the received source program. The system then generates executable code comprising: code for creating an object that includes a derived function in the set, and code for searching for an implementation of a derived function in the set at runtime. Finally, the system runs the generated executable code at runtime.

In one embodiment described herein, in response to receiving an instruction to find the implementation of a derived function, the system recursively searches for an implementation for the derived function in related objects In some embodiments described herein, the system searches for an implementation of a derived function in related objects using depth-first, breadth-first, other graph search algorithms, or combination thereof.

DETAILED DESCRIPTION

Figure 1:
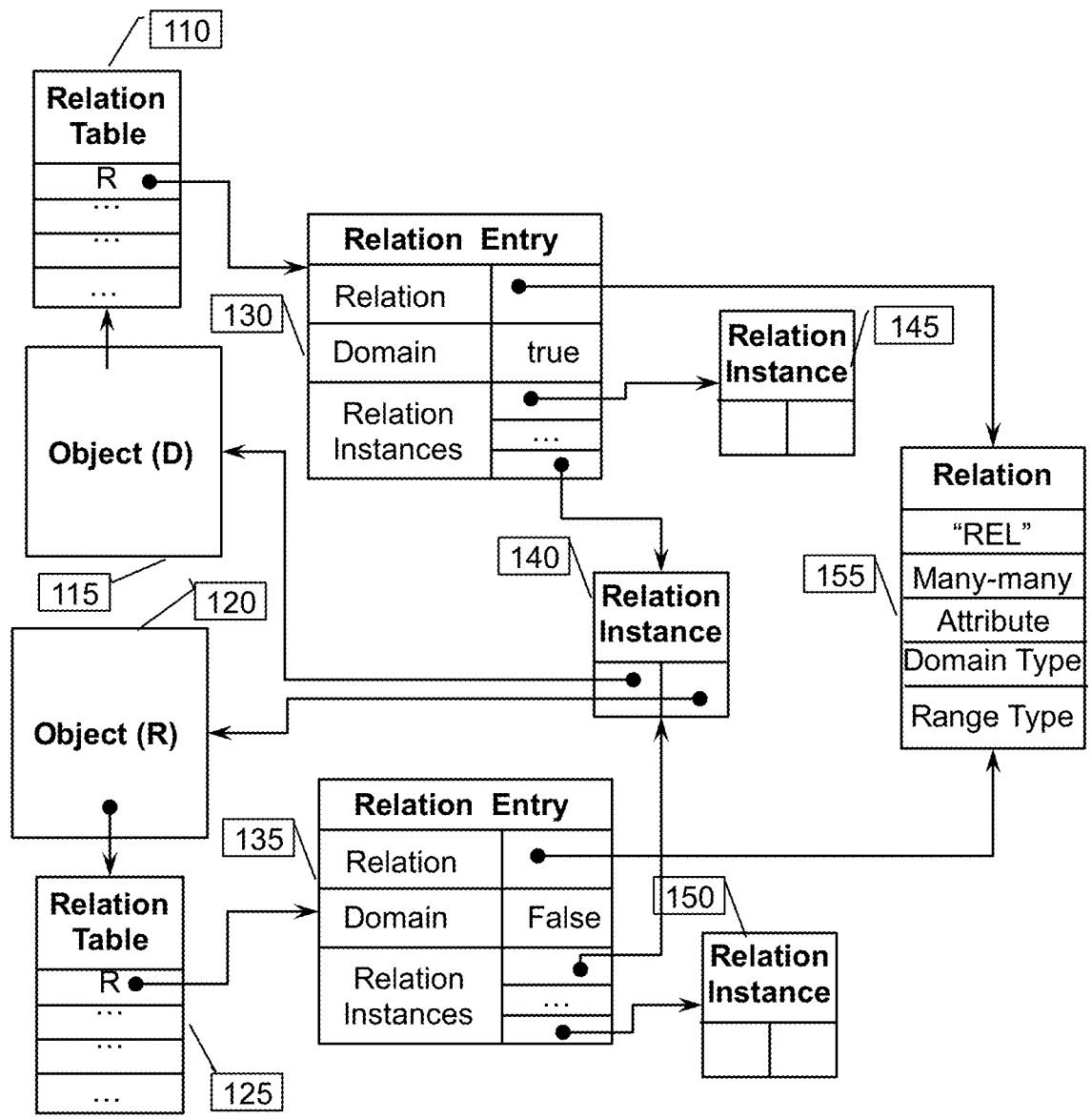
FIG. 1 depicts a representation of objects and relations in memory in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored in a non-transitory computer-readable storage medium as described above. When a computer system reads and executes the code and/or data stored on the computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

General Overview

As software systems become more complex and model real world entities, real world relationships, and real world behaviors, software applications need the ability to model states and behaviors that are dependent not only on individual entities, but also on the relationships within which these entities occur. These relationships define the context in which these states and behaviors exist. The term relation-context state and behavior will be used for such state and behavior in this document.

For instance, in a nested document, such as the one defined by XML or HTML, the style properties (for instance, font size) of a document element (for instance, a paragraph) may be derived from its parent element (for instance, a section). A document rendering system may look for the font size of the paragraph element in the data structure for the paragraph element. If the font size is not defined in the paragraph element, the document rendering system may search for the value of the font size in the parent element of the paragraph element. In this example, the font size of the paragraph element is defined within the context of the paragraph's element's relationship with the parent section element. As the style properties of the parent element changes, the style properties of the child element changes as well. Also, if the parent of the child element changes, its font size property changes as well.

Similarly, the functional behavior of a component may actually be defined by another component. For instance, in many software applications, a proxy pattern captures a commonly occur scenario in which methods invoked on an object is routed to another object which actually implements the methods. Many other software engineering patterns (for instance, the Model-View-Controller pattern) capture similar software architecture scenarios.

Common in both scenarios is that the state and behavior of software components are defined by their relationships with other software components.

Current software environments do not directly support mechanisms for modeling such relation-context specific state and behavior. This means that software systems and applications must implement their own infrastructure for realizing these specific situations. For instance, systems that implement the HTML document model implement runtime support that searches for specific style values that may be derived from one of the parent elements. Similarly, graphics library in mobile operating systems such as iOS™ and Android™ implement the Model View Controller patterns by hardwiring the behavior search mechanism within the relationship hierarchy itself. This involves searching for specific behavior along the window or view/sub-view hierarchy.

There are several problems with the above approaches: all applications that require such context-specific behavior must separately and explicitly implement the runtime infrastructure to support relation-context specific behavior. Such runtime infrastructure is hard to implement and may lead to significant runtime bugs and errors. Further, since every application must implement them separately, there is significant duplication of effort within applications and across applications.

Embodiments described herein propose a system in which software applications and systems can identify relation-context specific states and behavior in a high programming language. Subsequently, a compiler generates the right code and bindings among the objects to identify relation-context specific states and behavior. In embodiments proposed herein, the programming language runtime environment automatically searches for context-specific behavior when the program is running. Such an approach enables programs to specify relation-context specific state and specific behavior for an object at compile time or at runtime, to discover state at runtime, and engender relation-context specific behavior at runtime.

Some embodiments proposed herein employ new concepts in a programming language. These concepts include the idea of a "relation," "derived state," and "derived behavior." The programming language employed is called Ankur.

Ankur is an object-oriented programming language that supports abstractions for modules, classes, functions, objects, threads, etc. It also allows for definition of relations, derived states and derived behavior. The Ankur compiler and runtime system enable creation, modification, and management of derived states and derived behavior during a program execution.

Details describing the concepts and the various embodiments follow.

Relations

A relation R between two sets, A and B, defines mappings between entities of sets A and B. Relational databases use relations to define tables about entities (for instance, an employee), and to model relationships among entities. The power of relational algebra- and calculus-based query languages stems from operators (such as Join) that use the properties of the relations to traverse tables, to combine data from multiple tables, and to normalize how information is represented. Most programming languages do not support relations as first class entities. In these languages, relations are either implicit in the programming language abstractions (for instance, the is-a relationship between classes), or implemented using pointers or references.

Relations capture specific semantic information among entities: the is-a relationship between classes captures the notion of generalization and specialization among entities, which then becomes a basis of type subtyping as well as reusability. The semantic information can be used by both the language runtime system as well as applications: for sharing information, for substitution, and for making inferences. By not explicitly representing and managing relationships, much of these capabilities are lost in traditional high programming languages.

Definition of Relations

Embodiments described herein directly support relations as first class entities in a programming language. A definition of a relation will include the following:

An identifier that uniquely names a relationship,
A domain class that specifies the type of the domain objects,
A range class that specifies the type of the range objects,
Cardinality that identifies whether the relation is one-one, one-many, many-one, or many-many, and
An optional attribute that specifies any data that associated with a specific relation.

The following examples show definitions of different kinds of relations defined in embodiments described herein.

One-One Relationship
Consider the following definition:

```
relation R::DomainClass,1 -> RangeClass,1 with Attribute
```

Relation R defines a one-one relationship between instance objects of DomainClass and RangeClass. This relationship specifies that only one instance of DomainClass is related with one instance of RangeClass. Each instance of this relationship may have a state that is an instance of class Attribute One-Many Relationship
Consider the following definition:

```
relation R::DomainClass,1 -> RangeClass,* with Attribute;
```

Relation R captures a one-many relationship as declared by DomainClass, 1→RangeClass, *. This declaration specifies that one (1) of domain DomainClass instance is related with many (*) range RangeClass instances. Each instance of this relationship has a state that is an instance of class Attribute.

Many-Many Relationship
Consider the following definition:

relation R::DomainClass,*→RangeClass,*;

The relation R is a many-many relationship. This declaration specifies that many (*) of domain DomainClass instances are related with many (*) range RangeClass instances.

Many-One Relationship
Consider the following definition:

relation R::DomainClass,*→RangeClass,1;

The relationship is a many-one relationship. This declaration specifies that many (*) domain DomainClass instances are related with one (1) range RangeClass instances.

Relation Instances

A Relation Instance denotes a specific relationship between a domain object and a range object.

Embodiments described herein support several relation expressions for creating, finding, and deleting relationships among objects.

Creation of Relations
The tertiary expression:
Relation::Domain Object→Range Object;
defines a "Relation" between a "Domain Object" and a "Range Object", and returns a relation instance of type "Relation". The following example illustrates this concept.

```
class Node { // declare a class
    data:Integer;
}
relation isLinkedTo:: Node, 1-> Node, * with State;
var head, node1, node2: Node; // Node objects
var ri1, ri2: isLinkedTo; // Instances of relation
head    = Node(data:82); // create a node object
node1   = Node(data:77); // create another node object
// create relationship between two objects
ri1     = isLinkedTo::head -> node1;
node2   = Node(data:234); // create another node object
// create relationship between node1 and node2
ri2     = isLinkedTo::node1 -> node2;
```

The above example defines a class, Node, and a one-many relation, isLinkedTo. An execution of the above example creates three objects of type Node: head, node1, and node2. The execution will create a relationship between head and node1, and a relationship between node1 and node2. The relation instance, ri1, refers to the relationship between head and node1, and the relation instance, ri2, refers to the relationship between node1 and node2.

In embodiments described herein, the relation instance creation allows one to define multiple domain and range objects in the same expression. For instance, the following code fragment connects node2 to two objects:

```
var node3, node4: Node;
var head, node1, node2: Node; // Node objects
var ri1, ri2: isLinkedTo; // Instances of relation
```

```
node3 = Node(data:80);// create a node object
node4 = Node(data:34); // create another node object
// create relationship
isLinkedTo::node2 -> node3, node4;
```

An execution of the above example creates two more objects of type Node: node3 and node4. The execution will create a relationship between node2, and node3 and node4.

Finding Range Objects

In embodiments described herein, relations are used to create semantic links between domain and range objects. Relation expressions provide support for traversing these semantic links. These include expressions for finding range objects given domain objects, and finding domain objects given range objects in embodiments described herein.

The expression

Relation::Domain Object→?*;

returns a list of all objects that are related to the "Domain Object" through "Relation." The following code fragment illustrates how range objects can be found in embodiments described herein.

```
var l1, l2: List;
l1 = IsLInkedTo::node1-> ?*// l1 = [node2]
l2 = isLinkedTo::node2-> ?*// l2 = [node3, node4]
```

Note that the range objects in the list are sorted in the order in which they form relationship with the domain objects.

The expression

Relation::Domain Object→?;

returns the first range object that is related to the "Domain Object" through "Relation." The following code fragment illustrates how range objects are found.

```
var l1, l2: Node;
l1 = IsLInkedTo::node1-> ? // l1 = node2
l2 = isLinkedTo::node2-> ? // l2 = node3
```

Finding Range Objects

Many applications need to find domain objects given range objects. The expression Relation::?*→Range Object;

returns a list of all domain objects that are related to the "Range Object" through "Relation." The following code fragment illustrates how range objects are found in embodiments described herein.

```
var l1, l2: List;
l1 = IsLInkedTo::?* -> node1; // l1 = [head]
l2 = isLinkedTo::?* -> node3; // l2 = [node2]
```

Note that the range objects in the list are sorted in the order in which they form relationships with the domain objects.

The expression

Relation::Domain Object→?;

returns the first range object that is related to the "Domain Object" through "Relation." The following code fragment illustrates how range objects are found.

```
var l1, l2: Node;
l1 = IsLInkedTo::node1-> ? // l1 = node2
l2 = isLinkedTo::node2-> ? // l2 = node3
``` returns the first range object that is related to the "Domain Object" through "Relation."

Deletion of Relations

A relationship between two objects can be removed through the deletion expression. The expression Relation:: Domain Object !→Range Object;

removes the relationship between the "domain object" and the "Range Object" through "Relation". For instance, the expression:

isLinkedTo::node1 !→node2;

results in removing the relationship between node1 and node2.

Implementing Relations, Relation Instances, and Relation-Related Expressions

Embodiments are described herein for implementing relations and relation expressions. The compiler takes as input programs containing definitions of relations and relation expressions, and generates code for building and managing relations and relation instances. During an execution, the data structure for each object will include a pointer to a relation table.

FIG. 1 shows a domain object D 115 and a range object R 120. The domain object contains a pointer to a relation table 110 and the range object contains a pointer to a relation table 125. The relation tables 110, 125 maintain relation entries for each relationship in which the corresponding object is involved. A relation entry 130 contains the following information: (a) pointer to a relation data structure 155 containing information about the relation, (b) a Boolean value indicating if the object is domain or range, and (c) a set of pointers to relation instances.

In embodiments described herein, to create a relation REL between a domain object D and a range object R, the runtime system will create a relation instance data structure 140, RI, which is a tuple <D, R, S>. The tuple contains pointers to the domain (D) and range (R) objects. S is the state associated with the relation instance. The runtime system will find the relation table T1 110 of D and T2 125 of R. The runtime system will then look for a relation entry E1 130 and E2 135 for relation REL in T1 and T2 respectively. If E1 is not found, the runtime system will create a relation entry E1 and insert it in T1. Similarly, if E2 is not found, the runtime system will create a relation entry E2 and insert it in T2. The system will then insert RI into relation entries E1 and E2.

In embodiments described herein, to find the range objects for a specific relation, REL, from a domain object, D 115, the runtime system will find relation entry E1 130 for REL in D's relation table 110. E1 contains the set of all relation instances for REL and D. The runtime system will then retrieve each relation instance, and return the range objects from the relation instances.

In embodiments described herein, to find the domain objects for a specific relation, REL, from a range object, R 120, the system will find relation entry E2 135 for R in R's relation table 135. E2 contains the set of all relation instances for REL and R. The runtime system will then retrieve each relation instance, and return the range objects from the relation instances.

In embodiments described herein, to remove a relation REL between a domain object D and range Object R, the runtime system will find the relation tables T1 and T2 in D and R objects respectively. It will then find the relation entry R1 for R in T1 and R2 for R in T2. From the relation instance entries T1 and T2, it will find the relation instance with entries to D and R. The runtime system will delete the relation instance, and removes it from relation entries T1 and T2. If there are no entries in relation entry T1 or T2, it removes T1 or T2 or both from the relation tables T1 and T2.

Specifying and Finding Derived States

In object-based programming languages, instance variables denote the state of an object. Embodiments described herein identify two kinds of states in an object: intrinsic and extrinsic. The intrinsic state of an object characterizes the object on its own. Changing the object's intrinsic state involves reading and modifying these variables in the object itself. Extrinsic properties are derived from an object's relationship with its environment, other objects, and context.

For example, consider the document model in HTML. The document model supports nesting of various elements (paragraphs, list, etc.). Consider a Section element object that may explicitly define its font, color, or text alignment attributes. The Section object may contain other elements, for instance paragraph or list element objects. Often, the font properties of a paragraph object may not be defined by paragraph object, but may be derived from one of its parent nodes, for instance the Section object. In this example, the font property of the paragraph object is a derived property, and it depends on this object's relationship with the Section object: it may be defined locally or may depend on its parent objects. As its parents change, the font (a derived) property may change as well.

Embodiments described herein provide programming language support to define, in addition to an object's intrinsic state, extrinsic states (derived variables) in the definition of objects.

Definition of Derived Variables

In embodiments described herein, the definition of a derived variable includes five components:

Variable name

Variable Type,

A set of relations that may determine an object's derived value at runtime,

Default value which is that value used when the derived value has not been set, and the object is not related with any other object, and Search direction, which specifies whether value for a derived variable should be searched in domain objects or range objects Consider the following program that defines two relations, R1 and R2, and a class A:

```
relation R1::A, 1-> A, 1;
relation R2::A, 1 -> A, 1;
class A {
    var m: Integer;
    dvar i: Integer default 4 with range in R1;
    dvar f: Float default 2.8 with domain in R2;
}
```

Class A defines an instance variable (m), and two derived variables (identified with the keywords dvar): i and f. Variable i is of type Integer, and has a default value of 4. The relationship that may define the value of variable i at runtime is R1. Further, the search for a value of i needs to be done in the range objects. Similarly, variable f is a derived variable of type Float. The default value of variable f is 2.8, and the search for a value of f needs to be done in the domain objects that are related through relationships R2.

In embodiments described herein, derived variables use the same naming mechanism as instance variables. The example below shows how the derived variables are accessed.

```
var a: A;
a = A( );
Console.print(a.i, ",", a.f);
// prints default values 4, 2.8
```

In the above example, a is an instance of class A. Expressions a.i and a.f access derived variables i and f in a. Since there is no relationship between a and any other object, accessing a.i and a.f returns their respective default values.

Searching for Value of a Derived Variable from Range Objects

A key characteristic of a derived variable is the ability to search for the value of the derived variable from one of the derived variable's relation objects. The following code fragment depicts how this is achieved:

```
var a, b, c: A;
a = A( ); // create an instance of A
b = A( ); // Create an instance of A
c = A( ); // Create an instance of A
R1::a->b;  // Object a is R1 related with object b
R1::b->c;  // Object b is R1 related with object c
Console.print(a.i, ",", a.f); // prints 4, 2.8
```

In order to find the value of i, the language runtime system looks at a R1 range object associated with a, which is b. The language runtime system looks to see if i has been defined locally. If not, the language runtime system searches for an R1 range object associated with b. In this case, the language runtime system finds object c. Since c does not define i locally, the language runtime system stops the search, and return the default value from a, which is 4.

The following code fragment changes the value of i in object c:

```
c.i = 22;
Console.print(a.i, ",", a.f); // prints 22, 2.8
```

In order to find the value of i, the language runtime system looks at an R1 range object associated with a, which is b. The system looks to see if has been defined locally. If not, the language runtime system searches for an R1 range object associated with b. In this example, the language runtime system finds object c. Object c has defined i locally to be 22. The language runtime system returns 22 as the value of a.i.

Searching for Value of a Derived Variable from Domain Objects

The language runtime system will allow one to derive values from domain objects as well. The search here takes place in the same manner. Consider the following code fragment:

```
var a, b, c: A;
a = A( );
b = A( );
c = A( );
R2::a->b;   // Object a is R2 related with object b
```

```
R2::b->c;   // Object b is R2 related with object c
Console.print(c.i, ",", c.f); // prints 4, 2.8
```

An execution of the above example creates a, b and c as instances of A. The execution also creates an R2 relationship from a to b, and an R2 relationship from b to c. When the program tries to access c.f, the runtime system will look for a value of c.f in c. Since c.f is derived, it will check to see it is locally defined. Since c.f is not locally defined in c, it searches for a value of c.f in the R2-related domain objects of c, which is b. The runtime system will then search for the value of c.f in b. Since the derived variable in b is not locally defined in b, the runtime system will search for value in R2 related domain object of b, which is a. The runtime system finds that a does not define f locally either. In this case, the search fails, and the runtime system returns the default value of f in c, which is 2.8.

The following code fragment changes the value of f in object a:

```
a.f = 9.7;
Console.print(c.i, ",", c.j); // prints 4, 9.7
```

In order to find the value of f, the language runtime system searches the object-relation graph. The language runtime system looks at an R2 range object associated with c, which is b. The language runtime system looks to see if f has been defined locally. If not, language runtime system searches for a R2 range object associated with b. In this case, the language runtime system finds object a. Object a has defined f locally to be 9.7. The language runtime system returns 9.7 as the value of a.f.

Implementation of Derived Variables

Figure 2:
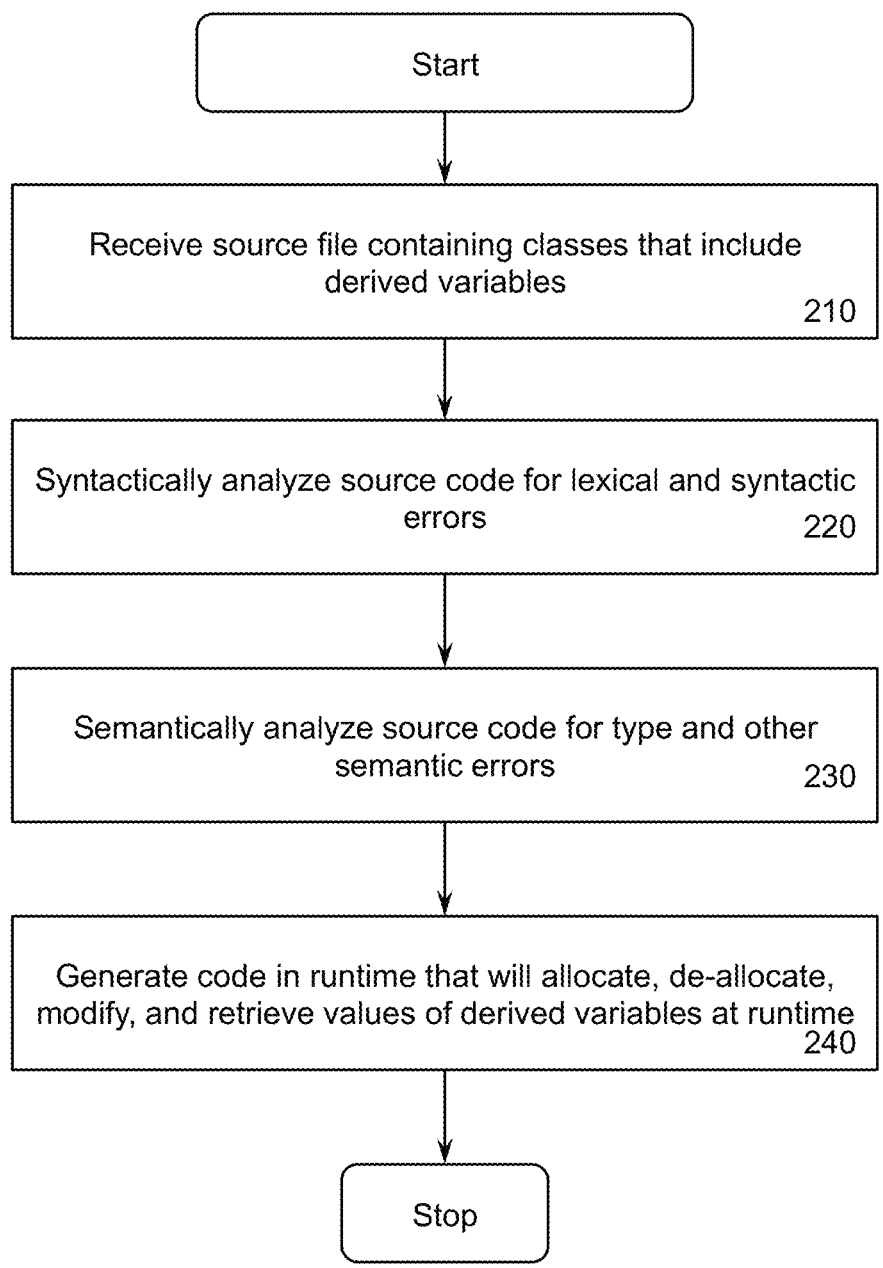
FIG. 2 depicts a flowchart for building an executable binary for an application with classes, relations, relation expressions, and derived variables in accordance with an embodiment of the present invention.
Figure 3:
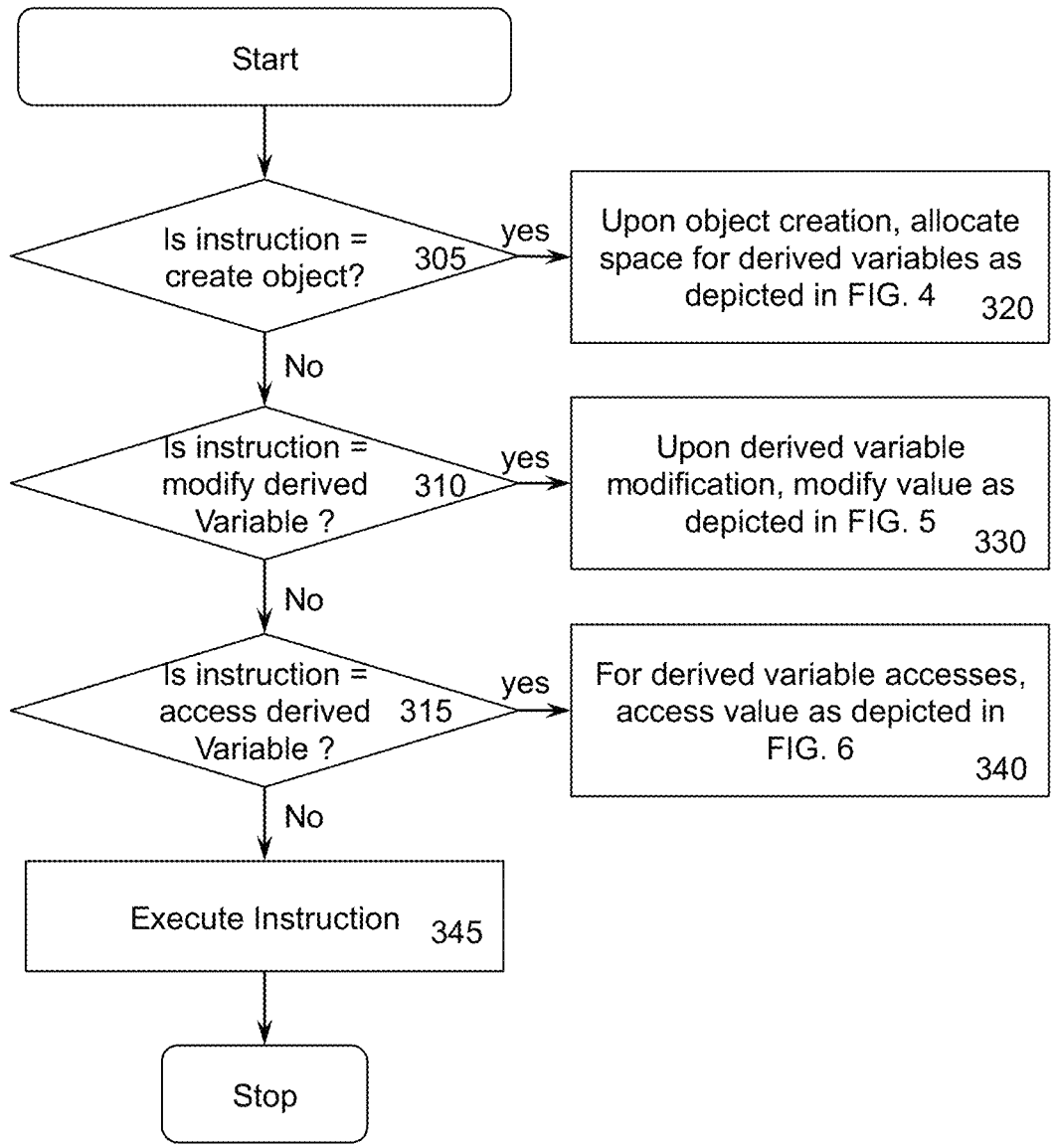
FIG. 3 depicts a flowchart for executing instructions for creating an object, assigning a value to a derived variable and searching the value of a derived variable in accordance with an embodiment of the present invention.

FIG. 2 and FIG. 3 together show a system for implementing derived variables and discovering values of derived variables at runtime.

FIG. 2 presents a flowchart illustrating a method for compilation for a program with derived variables. The steps of FIG. 2 constitute merely one of many methods that may be performed for compiling a program with derived variables. Other methods may include more or fewer steps in other orders than depicted in FIG. 2.

In step 210, the system takes as input a program that (a) contains definitions of classes and relations, (b) definitions of classes include derived variables, (c) relation expressions, and (c) expression that access derived variable. The system performs a syntax and semantic analysis to ensure type safety of the derived variables in steps 220 and 230. In step 240, it generates code for creating objects that contain derived variables, for modifying the value of a derived variable, and for searching for derived variables when the program is running.

FIG. 3 presents a flowchart illustrating a method for discovering values of derived variables while executing the code at runtime. The steps of FIG. 3 constitute merely one of many methods that may be performed for discovering values of derived variables while executing the code at runtime. Other methods may include more or fewer steps in other orders than depicted in FIG. 3.

During an execution, the runtime system takes steps to allocate space for derived variables, allow programs to modify derived variables, and allow them to modify derived variables, and search for values of the derived variables.

These steps are described in detail below. The runtime system executes each instruction of the program. If the instruction involves creating an object step 305, the runtime executes the algorithm described in FIG. 4 in step 320. If the instruction involves modifying a derived variable step 310, the runtime will execute the algorithm described in FIG. 5 in step 330. If the instruction involves modifying a derived variable step 315, the runtime will execute the algorithm described in FIG. 5 in step 340. Otherwise the instruction does not involve any derived variables. The runtime system will execute the instruction normally in step 345.

Figure 4:
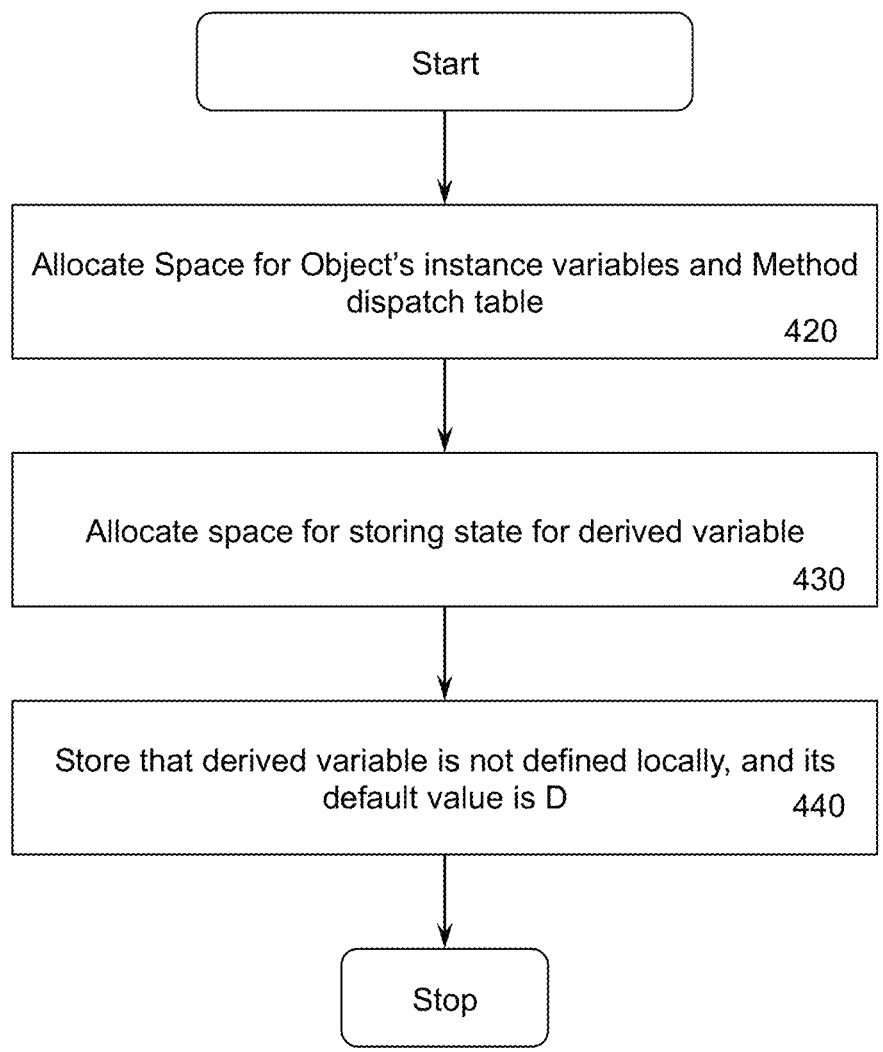
FIG. 4 depicts a flowchart for creating an object, and allocating space for a derived variable and initializing the derived variable in accordance with an embodiment of the present invention.

Object Creation:

FIG. 4 presents a flowchart illustrating a method for implementing creation of objects that may contain derived variables. The steps of FIG. 4 constitute merely one of many methods. Other methods may include more or fewer steps in other orders than depicted in FIG. 4.

Assume that a class C defines a derived variable named V of type T with default value D. The runtime system allocates space for all instance variables of C and for a method dispatch table in Step 420. The runtime system then allocates space for storing the derived variable step 430. The state stores two kinds of information: one stores whether the derived variable is defined locally, and the other the actual value. One implementation involves storing the state as a tuple <IsLocal, Value>, where IsLocal is a Boolean value, and Value is the actual Value associated with the derived variable. When IsLocal is true, the value is locally defined. Otherwise, the value is the default value.

Value is the actual value associated with the derived variable V. In Step 430, it allocates space for a value of size T. Finally, in step 440, the system stores the fact the derived value is not locally defined and the default value is D in the state associated with the derived variable.

Object Deletion:

When an object is released, de-allocate all space assigned to instance variables, derived variables and the method dispatch table.

Figure 5:
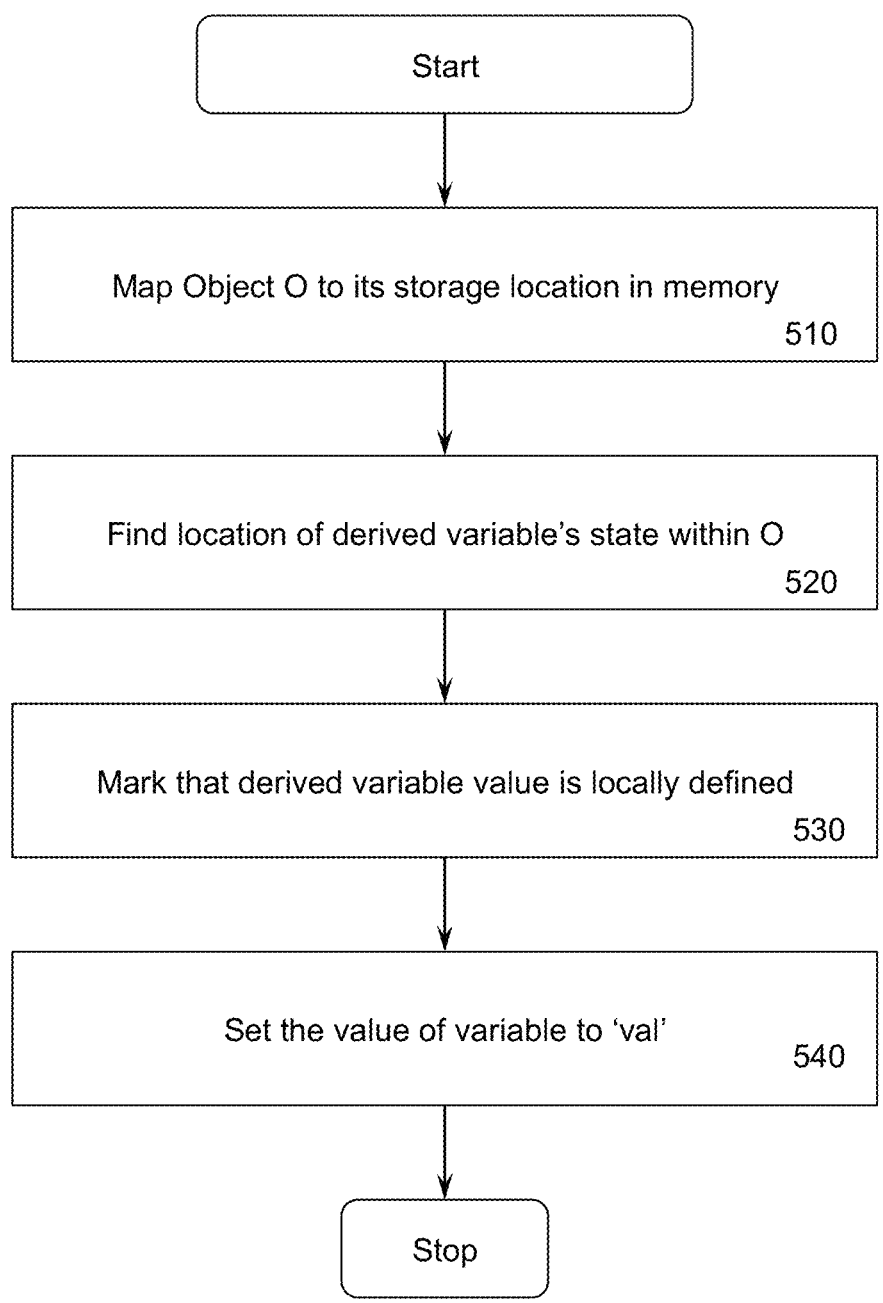
FIG. 5 depicts a flowchart for assigning a value to a derived variable in accordance with an embodiment of the present invention.

FIG. 5 presents a flowchart illustrating a method for assigning a value to a derived variable at runtime. The steps of FIG. 5 constitute merely one of many methods that may be performed for assigning a value to a derived variable at runtime. Other methods may include more or fewer steps in other orders than depicted in FIG. 5.

FIG. 5 shows the steps taken by runtime to store a value 'val' in a derived variable D of object O. In Step 510, the runtime system maps object O to its storage location in memory. The runtime system then finds the location of the state for the derived variable D in step 520. The runtime system first marks the fact that the value for D is defined locally in step 530. The runtime system then stores 'val' in D in step 540.

Retrieve the Value of a Derived Variable:

In order to retrieve the value of a derived variable D of an object O during execution, the runtime system searches related objects of O for the value.

Figure 6:
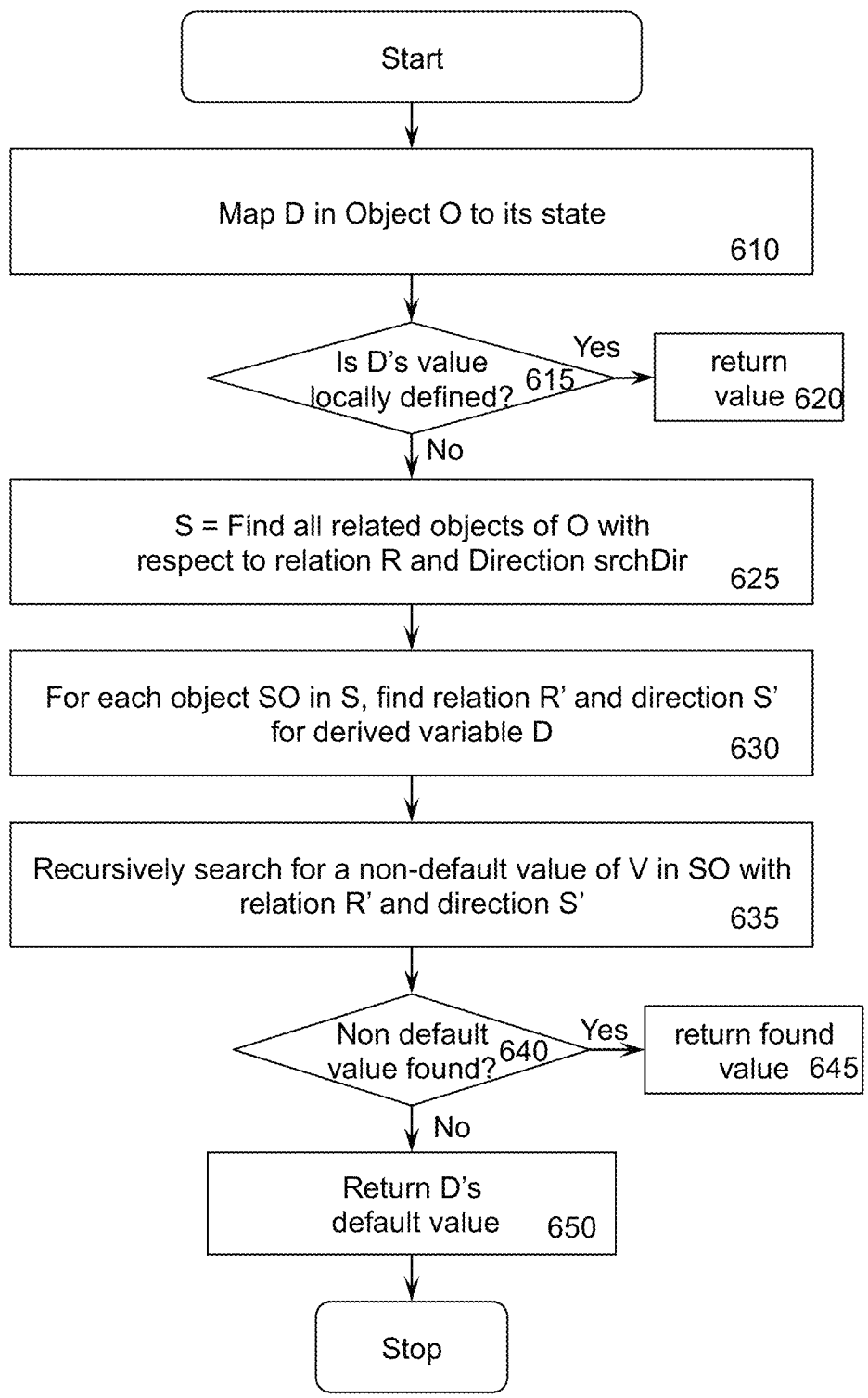
FIG. 6 depicts a flowchart for searching the value of a derived variable in accordance with an embodiment of the present invention.

FIG. 6 shows the steps taken by the runtime system. FIG. 6 presents a flowchart illustrating a method for finding the value of a derived variable. The steps of FIG. 6 constitute merely one of many methods that may be performed for finding the value of a derived variable. Other methods may include more or fewer steps in other orders than depicted in FIG. 6.

In Step 610, the runtime system determines the location of the derived variable. If the value of the derived variable is locally defined step 615, it retrieves the value and returns it. Otherwise it will first find all related variables of D for specific relation R in search direction srchDir in step 625. In step 630, it looks at every related variable, the related relations and search direction. In step 635, the runtime system then recursively searches for the derived variable D in each of the related variables. If a non-default value is found step 640, the runtime system returns the found value in step 645. If none of the related variables produce a non-default value, the runtime system returns the D's default value in step 650.

The following pseudo-code shows an algorithm implemented in some embodiments of the runtime system to find a value. An execution of the algorithm performs a depth-first traversal of the object-relation graph. Once one object is found that has the derived variable locally defined, the value associated with the derived value is returned. If no object with locally defined value of the derived variable is found, the execution will return the default value of the variable:

```
function findDerivedVariableValue(
    o: Object, // Derived variable's object
    v: Variable, // derived variable
    R:Relation, // search in R-related objects
    srchDir:Boolean) // if true, domain else orange
    :Value {
    var rObjects: List;
    var targetValue;
    var nestedR: Relation;
    var nestedS: Boolean;
    if (v is defined locally)
        return value of v;
    // find all domain or range objects that are
    // R-related to o depending on srchDir
    rObjects = getRelatedObjects(o, R, srchDir);
    // Do a depth first search on graph defined by
    // objects and their related objects
    foreach rObject in rObjects {
        if (v is Locally defined)
            return value of v;
        // Need to search in related objects
        // of rObject
        nestedR = get relation for v;
        nestedS = get search direction for v;
        // call findDerivedVariableValue
        // to do depth first search
        targetValue = findDerivedVariableValue
            (rObject, v, nestedR, nestedS);
        if targetValue is null
            continue; // keep searching
        return targetValue;
    }
    // Did not find any non-default value
    return null;
}
```

Derived Functions

In many cases, the behavior of an object is defined by relationships with other objects. In some cases, the object acquires behavior from other objects, while in others the object delegates its behavior to other objects. Embodiments presented herein propose derived functions as a means of augmenting instance methods (intrinsic behavior) of objects to model relation-context specific behavior. Derived functions provide a unified model for many behavioral patterns (such as Model-View-Control, chain of responsibility, mediator, observer, and visitor).

Definition of Derived Functions

In embodiments described herein, the definition of a derived function has the following components:

Function prototype (name, formal parameters, and result type),

A default body, which is executed if no related functions from either domain or range objects are found, A set of relations that may determine an object's derived function's implementation, and Search direction.

Consider the definitions of two relations and a class:

```
relation R1::A, 1-> A, 1;
relation R2::A, 1 -> A, 1;
class A {
    dfunction sum(a, b):Any {return 1;}
        with range in R1;
    function mult(a, b):Any {return a*b;}
}
```

Class A defines a derived function sum (identified with the keywords dfunction) and an instance function mult. Its default implementation behavior is defined by {return 1;}. The direction, range, in the definition indicates that the runtime system will search for an implementation of sum in R1-related range objects of A.

In some embodiments described herein, derived functions use the same naming mechanism as instance functions. The example below shows how they can be invoked.

```
var a1: A;
var r: Any;
a1 = A( );
r = a1.sum(4, 9); // call derived function sum on a1
```

Invocation of sum on a1 first involves searching for an implementation of sum in a1. Since sum is a derived function, the runtime system will look for R1-related objects. Since a1 is not related to any object, the search fails. The runtime system then finds the default implementation and executes it. The system then returns the result of the default body.

Finding an Implementation of a Derived Function

In embodiments described herein, a characteristic of a derived function is the runtime system's ability to find an implementation of the function in a related object. Consider the definition of class B:

```
class B {
    function sum(a, b):Any {return a+b;}
    dfunction mult(a, b):Any {return 0;}
        with domain in R2;
}
```

Class B implements function sum. The class also defines a derived function mult.

Searching for a Derived Function from Range Objects:

An embodiment presented herein describes pseudo-code for searching range objects to find an implementation for a derived function. Consider the following code fragment:

```
var a1: A;
var b1: B;
var r;
a1 = A( ); // create an instance of A
b1 = B( ); // create an instance of B
// call sum on a1 -> use default implementation
r = a1.sum(2, 3); // r = 1
// call sum on b1 -> use instance function
// implementation
r = b1.sum(2, 3); // r = 5
// create R1 relationship between a1 and b1
R1::a1->b1;
```

```
// call sum on a1 -> search for sum in
// range objects of a1
// find sum in b1, execute it
r = a1.sum(2, 3); // r = 5
```

Invocation of sum involves the runtime system searching for an implementation of sum in a1. Since sum is a derived function, the runtime system will look for R1-related objects. Since a1 is related to b1, the runtime system will search for an implementation of sum in b1. The system finds an implementation of sum in b1. The runtime system then invokes sum on b1, and returns the result.

Searching for a Derived Function from Domain Objects:

Some embodiments presented herein describe a method for searching domain objects to find an implementation for a derived function. Consider the following code fragment:

```
var a2: A;
var b2: B;
var r;
a2 = A( ); // create an instance of A
b2 = B( ); // create an instance of B
// create R2 relationship between a2 and b2
R2::a2->b2;
// call mult on b2 -> search for mult in
// domain objects of b2
// find mult in a2, execute it
r = b2.mult (2, 3); // r = 6;
```

An invocation of mult involves the runtime system searching for an implementation of mult in b2. Since mult is a derived function, the runtime system will look for R2-related objects. Since b2 is related to a2, the runtime will search for an implementation of mult in a2. It finds an implementation of mult in a2. The runtime system then invokes sum on a2, and returns the result.

Implementation of Derived Functions

Figure 7:
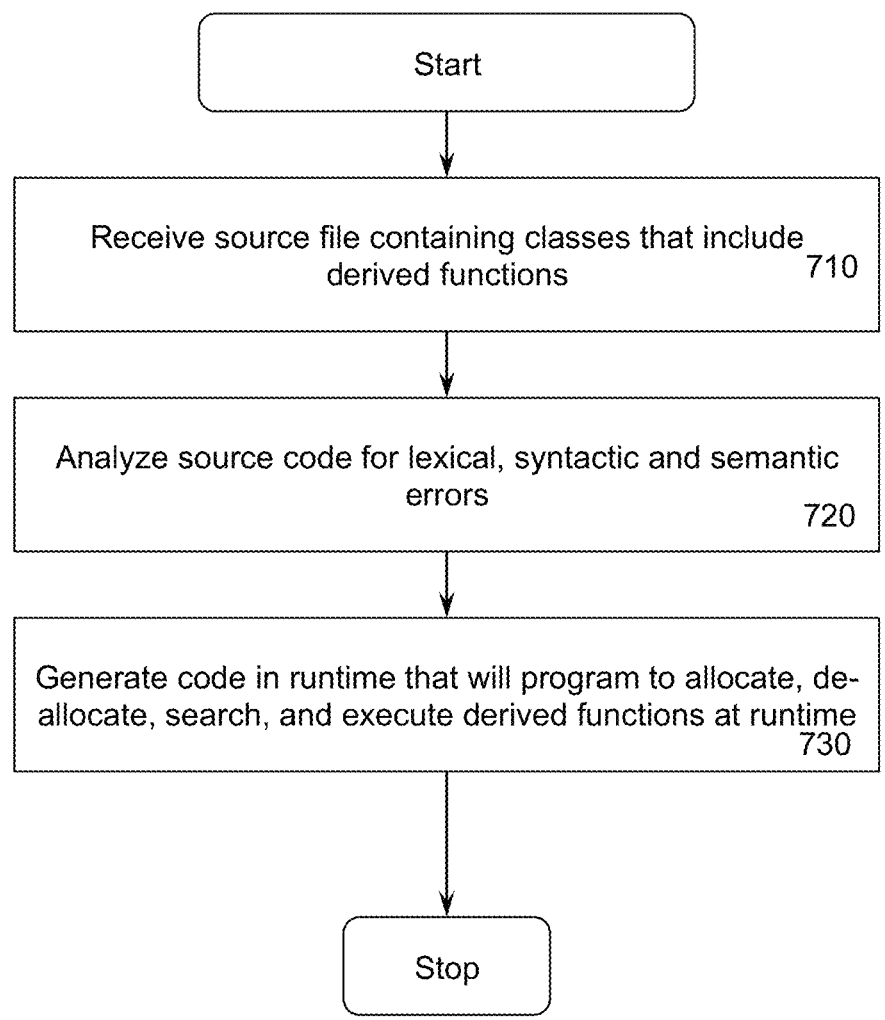
FIG. 7 depicts a flowchart for building an executable binary for an application with classes, relations, relation expressions, and derived functions in accordance with an embodiment of the present invention.

FIG. 7 describes a system for implementing derived functions. FIG. 7 presents a flowchart for implementing derived functions. The steps of FIG. 7 constitute merely one of many methods that may be performed for implementing derived functions. Other methods may include more or fewer steps in other orders than depicted in FIG. 7.

In step 710, the system takes as input a program that contains classes, relations, and derived functions. In step 720, it analyzes the code for lexical, syntax, type and other semantic error that may come from using derived functions. In step 730, the system then generates runtime system code for searching and executing derived functions, as described below.

Assume that a class C defines a derived method named f with a default implementation D. The class also defines the direction that will be used for searching an implementation for f. The direction indicates if the language runtime system should search for f in domain or range objects. The method uses the depth-first search algorithm on the object graph to look for an implementation of f. If the runtime system does not find any implementation, it will execute the default implementation.

Figure 8:
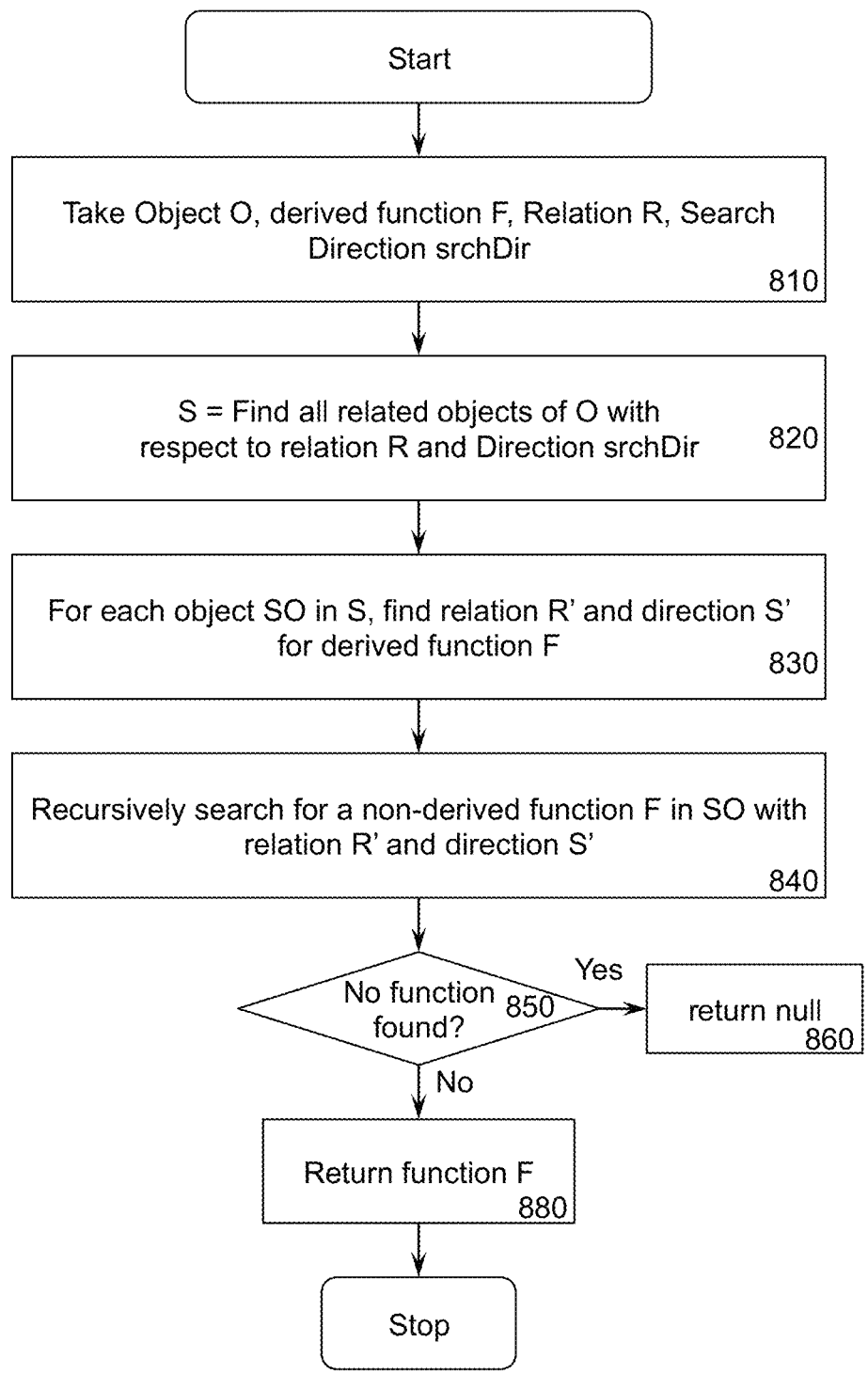
FIG. 8 depicts a flowchart for searching the implementation of a derived function in accordance with an embodiment of the present invention.

FIG. 8 presents a flowchart for finding an implementation of a derived function. The steps of FIG. 8 constitute merely one of many methods that may be performed for finding an implementation of a derived function. Other methods may include more or fewer steps in other orders than depicted in FIG. 8.

The runtime system takes as input an Object O, derived function F, relation R, search direction srchDir in step 810. The runtime system finds all R-related objects in direction srchDir in step 820. For each such R-related object, the runtime system finds their relations R' and directions S' in step 830. Using S' and R', the runtime system recursively searches for a non-derived function F in these objects in step 840. If no function implementation is found step 850, the runtime system returns null in step 860. Otherwise the runtime system returns the found function implementation in step 880.

Some embodiments presented herein implement the search for finding an implementation of a derived function as depicted in the pseudo code below.

```
function findDerivedFunctionImplementation(
    o: Object, // object on which function f is invoked
    f: Function, // function f
    R:Relation, // search in R-related objects
    srchDir:Boolean) // true=>search in domain objects else
    range objects
    :Object, Function { // returns object, Function
        var rObjects: List;
        var tFunc= null: Function;
        var nestedR: Relation;
        var nestedS: Boolean;
        var targetObject: Object;
        // find all R-related objects of o using srchDir
        rObjects = getRelatedObjects(o, R, srchDir);
        // Do a depth first search on graph defined
        // by objects and their related objects
        foreach rdObject in rObjects {
            tFunc= find function f in rObject;
            if tFunc is not found
                // continue with next related object
                continue;
            // there is a function defined
            if tFunc is not a derived function
            // found a function with right signature
                return rdObject, tFunc;
            // found function is derived too
            // Recursively search in related objects of
            // rdObject
            nestedR = get tFunc's relation;
            nestedS = get search direction from tFunc;
            tObject, tFunc =findDerivedFunctionImplementation
                                 (rObject, f, nestedR, nestedS);
            if tFunc is a derived function
                continue;
            return tObject , tFunc;
        }
        // Did not find implementation
        return null, null;
}
```

In some embodiments described herein the system performs the following operations when a derived method, f, is invoked on an object O:

Find the relationship and search direction from function f. The implementation of f keeps track of these two data structure.

```
relation = get f's relation on search is done
srcDir = get search direction from f
```

Call findDerivedFunctionImplementation to find a function that may provide an implementation

```
targetObject, implFunc =
  findDerivedFunctionImplementation(O, f, relation,
  srcDir)
```

If implFunc is null, this means that no implementation off could be found. In that case, the runtime system will execute the default body of function f. Otherwise, it will invoke implFunc on targetObject

```
if (implFunc == null) {
    var body: Statements;
    body = get function f's default implementation
    evaluate Body;
} else {
    evaluate implFunc on targetObject.
}
```

Computing Environment

Figure 9:
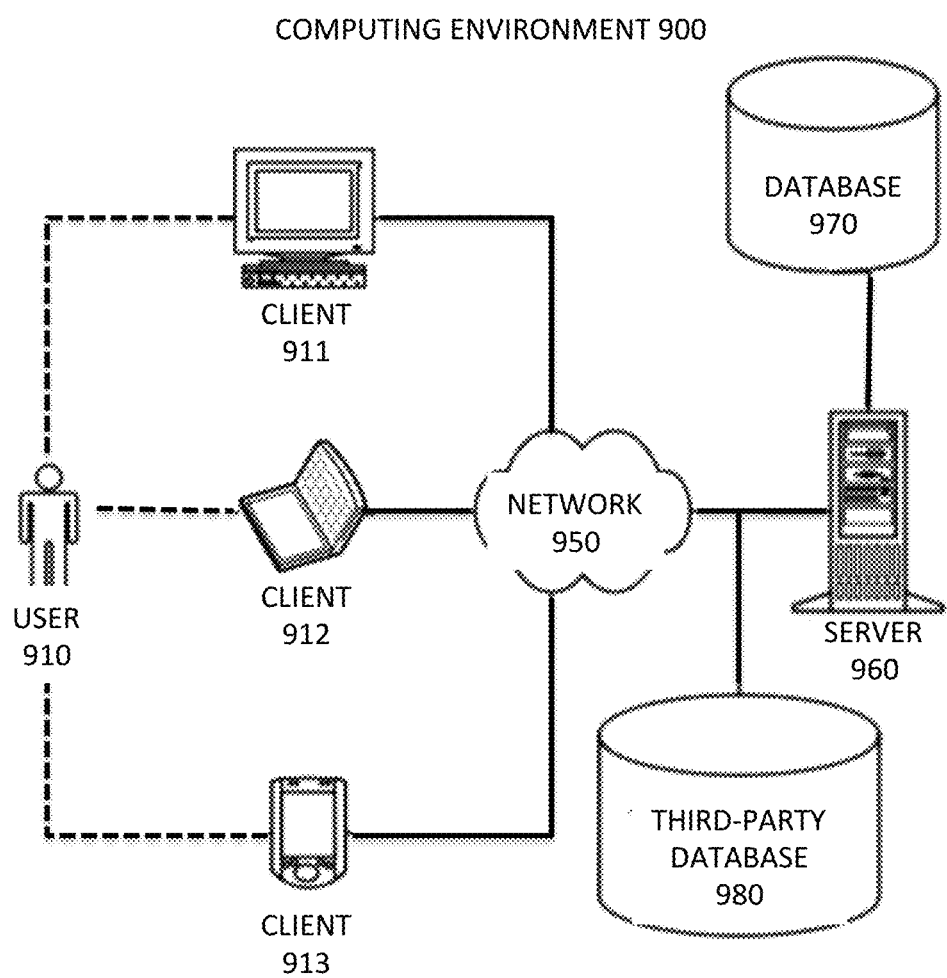
FIG. 9 presents a computing environment in accordance with an embodiment of the present invention.

FIG. 9 illustrates a network in accordance with an embodiment of the present invention. Computing environment 900 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 8, computing environment 900 includes a user 910; clients 911-913; a common network access point 940, possibly acting as a Wi-Fi hotspot and providing local wireless connectivity to clients 911-913, that connects to a network 950; a server 960; and a database 970, possibly acting as cloud data storage.

Clients 911-913 can include any node on a network including computational capability and including a mechanism for communicating across the network. Additionally, clients 911-913 may comprise a tier in an n-tier application architecture, wherein clients 911-913 perform as servers (servicing requests from lower tiers or users), and wherein clients 911-913 perform as clients (forwarding the requests to a higher tier). Furthermore, a client can include any type of electronic device, including, but not limited to, cell phones, personal digital assistants (PDAs), smartphones, tablet systems, personal music players (such as MP3 players), gaming systems, digital cameras, video cameras, portable storage media, or any other device that can be coupled to the client.

Similarly, a server 960 can generally include any node on a network including a mechanism for servicing requests from a client for computational and/or data storage resources. A server 960 can participate in an advanced computing cluster, or can act as a stand-alone server.

A user 910 can include: an individual; a group of individuals; an organization; a group of organizations; a computing system; a group of computing systems; or any other entity that can interact with computing environment 800.

Network 950 can include any type of wired or wireless communication channel capable of coupling together computing nodes. This includes, but is not limited to, a local area network, a wide area network, or a combination of networks. In one embodiment of the present invention, network 950 includes the Internet. In some embodiments of the present invention, network 950 includes phone and cellular phone networks.

Database 970 can include any type of system for storing data in non-volatile storage. This includes, but is not limited to, systems based upon magnetic, optical, or magneto-optical storage devices, as well as storage devices based on flash memory and/or battery-backed up memory. Note that database 870 can act as cloud data storage and can be coupled: to a server (such as server 860), to a client, or directly to a network.

Note that different embodiments of the present invention may use different system configurations, and are not limited to the system configuration illustrated in computing environment 800. In general, any device that is capable of communicating via network 850 may incorporate elements of the present invention.

System

Figure 10:
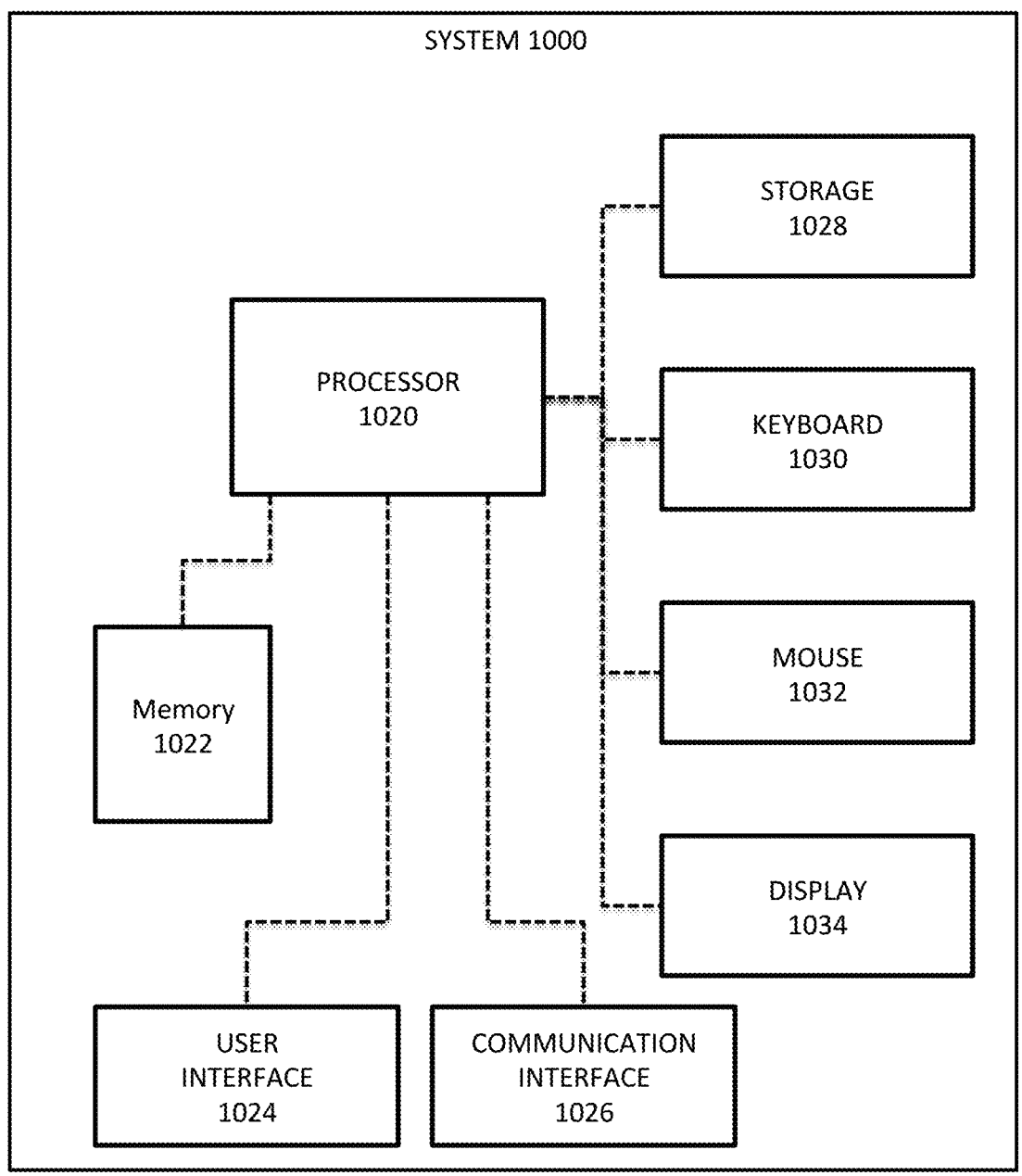
FIG. 10 illustrates a system in accordance with an embodiment of the present invention.

FIG. 10 illustrates a system 1000 in accordance with an embodiment of the present invention. As illustrated in FIG. 10, system 1000 can include processor 1020, memory 1022, user interface 1024, communication interface 1026, storage 1028, and/or other components found in electronic computing devices. Processor 1020 may support parallel processing and/or multi-threaded operation with other processors in computer system 1000. Computer system 1000 may also include input/output (I/O) devices such as a keyboard 1030, a mouse 1032 and a display 1034.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to run a source program comprising:
   receiving a source program, wherein the source program includes a set of one or more derived variables, and wherein a derived variable in the set of one or more derived variables includes:
      a variable name,
      a variable type,
      a set of relations that determine a value of the derived variable in the set of one or more derived variables at runtime,
      a default value that specifies a value used when the value of the derived variable in the set of one or more derived variables has not been set, and the derived variable in the set of one or more derived variables is not related with any other derived variable in the set of one or more derived variables, and
      a search direction that specifies whether the value of the derived variable in the set of one or more derived variables should be searched in one or more domain objects or one or more range objects;
   performing syntax and semantic analysis on the received source program;
   generating executable code, wherein the generated executable code, when executed, performs:
      creating an object that includes a derived variable in the set of one or more derived variables;
      assigning a value to a derived variable in the set of one or more derived variables; and
      searching for a value of a derived variable in the set of one or more derived variables at runtime; and
   running the generated executable code at runtime.

2. The method of claim 1, wherein, in response to receiving an instruction to create an object that includes a derived variable in the set of one or more derived variables, the method further comprises:
   allocating memory for the derived variable in the set of one or more derived variables; and
   maintaining state information about the derived variable in the set of one or more derived variables.

3. The method of claim 2, wherein maintaining state information about the derived variable in the set of one or more derived variables comprises maintaining information that the value of the derived variable in the set of one or more derived variables is either defined locally or is obtained from a related object.

4. The method of claim 1, wherein assigning a value to a derived variable in the set of one or more derived variables comprises storing the value of the derived variable in the set of one or more derived variables in maintained state information and maintaining information that the value of the derived variable in the set of one or more derived variables is defined locally.

5. The method of claim 1, wherein searching for a value of a derived variable in the set of one or more derived variables involves recursively searching for a value for the derived variable in the set of one or more derived variables in related objects.

6. The method of claim 5, wherein the recursive searching is performed as a depth-first search, a breadth-first search, other graph search algorithms, or any combination thereof.

7. A method to run a source program comprising:
receiving a source program, wherein the source program includes a set of one or more derived functions, and wherein a derived function in the set of one or more derived functions contains:
a function prototype,
a default body, which is executed if no related functions from either one or more domain objects or one or more range objects are found,
a set of relations that determine an implementation of the derived function in the set of one or more derived functions, and
a search direction that specifies whether the implementation of the derived function in the set of one or more derived functions should be searched in one or more domain objects or one or more range objects;
performing syntax and semantic analysis on the received source program;
generating executable code, wherein the generated executable code, when executed, performs searching for an implementation of a derived function in the set of one or more derived functions in related objects at runtime; and
running the generated executable code at runtime.

8. The method of claim 7, wherein searching for an implementation of a derived function in the set of one or more derived functions in related objects involves recursively searching for an implementation of the derived function in the set of one or more derived functions in related objects.

9. The method of claim 8, wherein the recursive searching is performed as a depth-first search, a breadth-first search, other graph search algorithms, or any combination thereof.

10. A non-transitory computer-readable storage medium storing instructions that, when executed by a computer, cause the computer to perform a method to run a source program, the method comprising:
receiving a source program, wherein the source program includes a set of one or more derived variables, and wherein a derived variable in the set of one or more derived variables includes:
a variable name,
a variable type,
a set of relations that determine a value of the derived variable in the set of one or more derived variables at runtime,
a default value that specifies a value used when the value of the derived variable in the set of one or more derived variables has not been set, and the derived variable in the set of one or more derived variables is not related with any other derived variable in the set of one or more derived variables, and
a search direction that specifies whether the value of the derived variable in the set of one or more derived variables should be searched in one or more domain objects or one or more range objects;
performing syntax and semantic analysis on the received source program;
generating executable code, wherein the generated executable code, when executed, performs:
creating an object that includes a derived variable in the set of one or more derived variables;
assigning a value to a derived variable in the set of one or more derived variables; and
searching for a value of a derived variable in the set of one or more derived variables at runtime; and
running the generated executable code at runtime.

11. The non-transitory computer-readable storage medium of claim 10, wherein, in response to receiving an instruction to create an object that includes a derived variable in the set of one or more derived variables, the method further comprises:
allocating memory for the derived variable in the set of one or more derived variables; and
maintaining state information about the derived variable in the set of one or more derived variables.

12. The non-transitory computer-readable storage medium of claim 11, wherein maintaining state information about the derived variable in the set of one or more derived variables comprises maintaining information that the value of the derived variable in the set of one or more derived variables is either defined locally or is obtained from a related object.

13. The non-transitory computer-readable storage medium of claim 10, wherein assigning a value to a derived variable in the set of one or more derived variables comprises storing the value of the derived variable in the set of one or more derived variables in maintained state information and maintaining information that the value of the derived variable in the set of one or more derived variables is defined locally.

14. The non-transitory computer-readable storage medium of claim 10, wherein searching for a value of a derived variable in the set of one or more derived variables involves recursively searching for a value for the derived variable in the set of one or more derived variables in related objects.

15. The non-transitory computer-readable storage medium of claim 14, wherein the recursive searching is performed as a depth-first search, a breadth-first search, other graph search algorithms, or any combination thereof.

16. A non-transitory computer-readable storage medium storing instructions that, when executed by a computer, cause the computer to perform a method to run a source program, the method comprising:
receiving a source program, wherein the source program includes a set of one or more derived functions, and wherein a derived function in the set of one or more derived functions contains:
a function prototype,
a default body, which is executed if no related functions from either one or more domain objects or one or more range objects are found, a set of relations that determine an implementation of the derived function in the set of one or more derived functions, and a search direction that specifies whether the implementation of the derived function in the set of one or more derived functions should be searched in one or more domain objects or one or more range objects;

performing syntax and semantic analysis on the received source program;

generating executable code, wherein the generated executable code, when executed, performs searching for an implementation of a derived function in the set of one or more derived functions in related objects at runtime; and running the generated executable code at runtime.

17. The non-transitory computer-readable storage medium of claim 16, wherein searching for a value of a derived function in the set of one or more derived functions involves recursively searching for an implementation of the derived function in the set of one or more derived functions in related objects.

18. The non-transitory computer-readable storage medium of claim 17, wherein the recursive searching is performed as a depth-first search, a breadth-first search, a general purpose graph search, or any combination thereof.

19. A system to run a source program, the system comprising:

a memory;

a processor; and a non-transitory computer-readable storage medium storing instructions that, when executed, cause the system to:

receive a source program, wherein the source program includes a set of one or more derived variables, and wherein a derived variable in the set of one or more derived variables includes:

a variable name, a variable type, a set of relations that determine a value of the derived variable in the set of one or more derived variables at runtime, a default value that specifies a value used when the value of the derived variable in the set of one or more derived variables has not been set, and the derived variable in the set of one or more derived variables is not related with any other derived variable in the set of one or more derived variables, and a search direction that specifies whether the value of the derived variable in the set of one or more derived variables should be searched in one or more domain objects or one or more range objects;

perform syntax and semantic analysis on the received source program;

generate executable code, wherein the generated executable code, when executed, performs:

creating an object that includes a derived variable in the set of one or more derived variables;

assigning a value to a derived variable in the set of one or more derived variables; and searching for a value of a derived variable in the set of one or more derived variables at runtime; and run the generated executable code at runtime.

20. A system to run a source program, the system comprising:

a memory;

a processor; and a non-transitory computer-readable storage medium storing instructions that, when executed, cause the system to:

receive a source program, wherein the source program includes a set of one or more derived functions, and wherein a derived function in the set of one or more derived functions contains:

a function prototype, a default body, which is executed if no related functions from either one or more domain objects or one or more range objects are found, a set of relations that determine an implementation of the derived function in the set of one or more derived functions, and a search direction that specifies whether the implementation of the derived function in the set of one or more derived functions should be searched in one or more domain objects or one or more range objects;

perform syntax and semantic analysis on the received source program;

generate executable code, wherein the generated executable code, when executed, performs searching for an implementation of a derived function in the set of one or more derived functions in related objects at runtime; and run the generated executable code at runtime.

* * * * *